US006772895B2

United States Patent
Liang et al.

(10) Patent No.: US 6,772,895 B2
(45) Date of Patent: Aug. 10, 2004

(54) CASING FOR ELECTRONIC DEVICES AND METHOD FOR PRODUCING THE SAME

(75) Inventors: Yuan-Chen Liang, Taipei (TW); Wei-Cheng Yen, Taipei Hsien (TW); Chih-Ming Hsu, Taoyuan (TW); Chia-Hui Wu, Chiai (TW)

(73) Assignee: Quanta Computer Inc., Taoyuan (TW)

( * ) Notice: Subject to any disclaimer, the term of this patent is extended or adjusted under 35 U.S.C. 154(b) by 134 days.

(21) Appl. No.: 10/170,038

(22) Filed: Jun. 11, 2002

(65) Prior Publication Data

US 2003/0095376 A1 May 22, 2003

(30) Foreign Application Priority Data

Nov. 22, 2001 (TW) ........................................ 90128924 A

(51) Int. Cl.[7] .......................... B65D 43/00; B65D 6/00
(52) U.S. Cl. ...................... 220/4.22; 220/4.02; 206/701
(58) Field of Search ............................... 220/4.2–4.28, 220/4.02, 812; 206/701, 521; 361/680–686

(56) References Cited

U.S. PATENT DOCUMENTS 5,207,342 A * 5/1993 Tsuji et al. ................. 220/4.02
6,196,405 B1 * 3/2001 Kambouris ................. 220/4.22

FOREIGN PATENT DOCUMENTS

DE         198 42 117 A1    3/2000    ........... B29C/45/00

* cited by examiner

Primary Examiner—Lisa Lea-Edmonds
(74) Attorney, Agent, or Firm—Merchant & Gould P.C.

(57) ABSTRACT

A casing for an electronic device and a method producing the same. The method comprises the following steps. First, a first member is formed of a first metallic material, and a second member is formed of a second metallic material. In the second member, at least one step portion is formed. Then, the casing is produced by combining the first member and the second member in a manner such that the step portion corresponds to the unit and the second member is nearer to the unit than the first member.

19 Claims, 5 Drawing Sheets

CASING FOR ELECTRONIC DEVICES AND METHOD FOR PRODUCING THE SAME

BACKGROUND OF THE INVENTION

1. Field of the Invention

The invention relates to a casing for an electronic device and a method for producing the same; in particular, to a method for producing a thin, light casing with a predetermined structural strength.

2. Description of the Related Art

Casings for portable electronic devices such as a notebook type computer, personal digital assistance device (PDA), portable telephone and the like, are required to be thin and light from the viewpoint of reducing the whole weight of the electronic device. However, the thin, light casing of the conventional electronic device is usually insufficient in its structural strength.

Specifically, the conventional casing is usually of titanium alloy so as to reduce its thickness. However, the casing, of titanium alloy, is usually insufficient in its structural strength. In contrast, the structural strength of the casing may be enhanced by disposing plastic material in a predetermined position. However, since the plastic material is provided with a certain thickness, the casing cannot be thin and light.

SUMMARY OF THE INVENTION

In order to address the disadvantages of the aforementioned casing, the invention provides a method for producing a thin, light casing with a predetermined structural strength.

Accordingly, the invention provides a method for producing a casing of an electronic device comprising the following steps. First, a first member is formed of a first metallic material, and a second member is formed of a second metallic material. Then, the casing is produced by combining the first member and the second member.

In a preferred embodiment, the first member and the second member are attached to each other by glue.

In another preferred embodiment, both the first metal and the second metallic material are sheets.

Furthermore, the first metallic material is thin and hard, and the second metallic material is provided with a predetermined structural strength.

Furthermore, the second metallic material is pressed into the second member, and the second metallic material is an alloy metal sheet.

In another preferred embodiment, the invention provides another method for producing a casing of an electronic device having at least one unit, comprising the following steps. First, a first member is formed of a first metallic material, and a second member is formed of a second metallic material. In the second member, at least one step portion is formed. Then, the casing is produced by combining the first member and the second member in a manner such that the step portion corresponds to the unit and the second member is nearer to the unit than the first member.

In another preferred embodiment, the invention provides a casing for an electronic device having at least one unit. The casing comprises a first member and a second member. The first member is made of a first metallic material, and the second member, having at least one step portion, is made of a second metallic material and disposed on the first member. The step portion corresponds to the unit and the second member is nearer to the unit than the first member.

In another preferred embodiment, the casing further comprises an adhesive portion. The adhesive portion, disposed between the first member and the second member, is used for attaching the first member and the second member.

BRIEF DESCRIPTION OF THE DRAWINGS

The invention is hereinafter described in detail with reference to the accompanying drawings in which:

FIG. 2b is a cross-section from a line B—B in FIG. 2a;

FIG. 2c is a cross-section from a line C—C in FIG. 2a;

FIG. 2d is a cross-section from a line D—D in FIG. 2a;

DETAILED DESCRIPTION OF THE INVENTION

Figure 1:
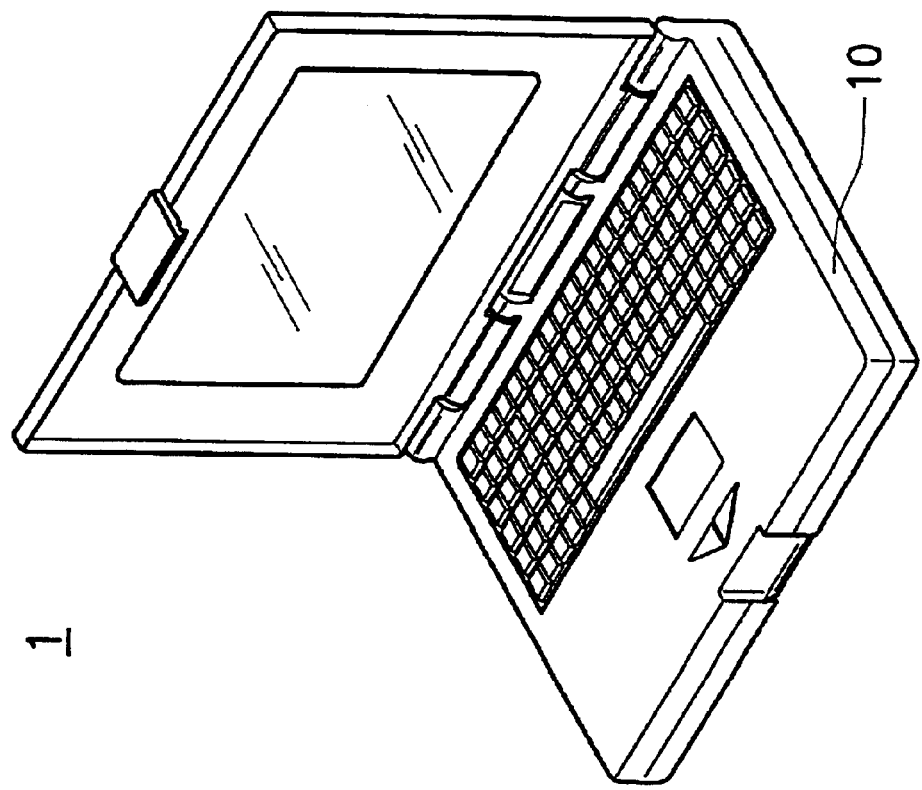
FIG. 1 is a schematic view depicting a notebook computer.
Figure 2A:
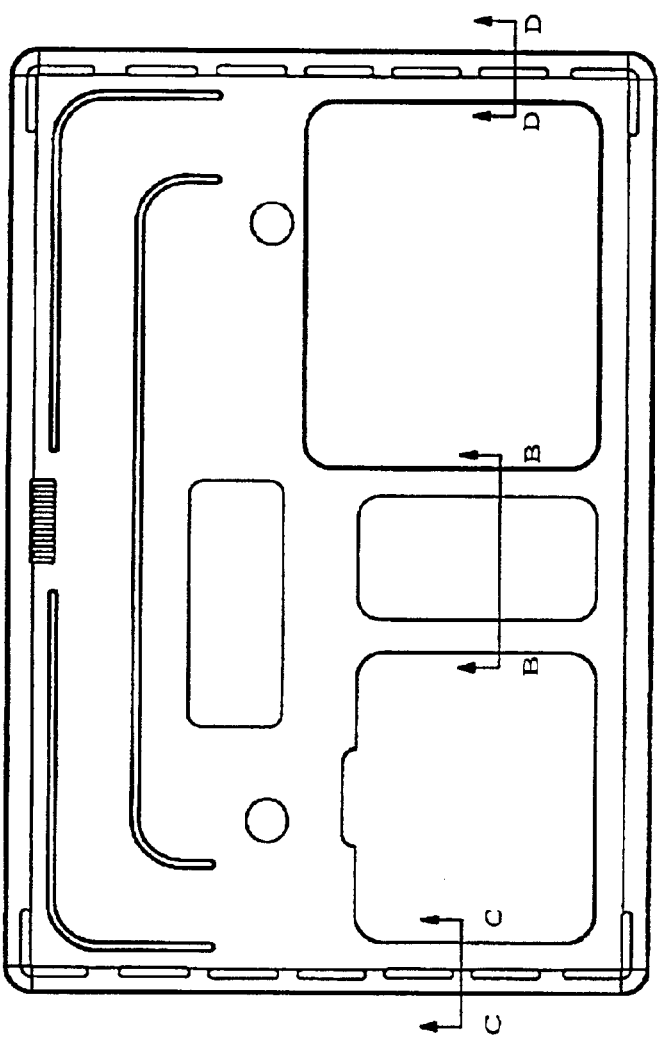
FIG. 2a is a top view depicting a casing for an electronic device as disclosed in this invention.
Figure 2B:
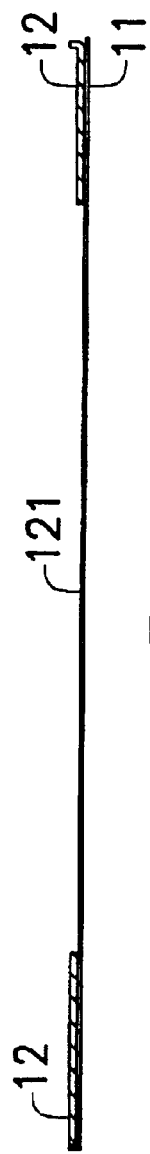
Figure 2D:
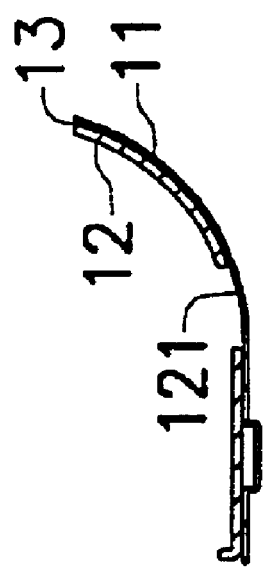
Figure 2C:
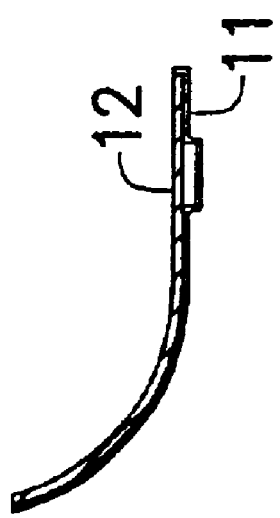
Figure 3:
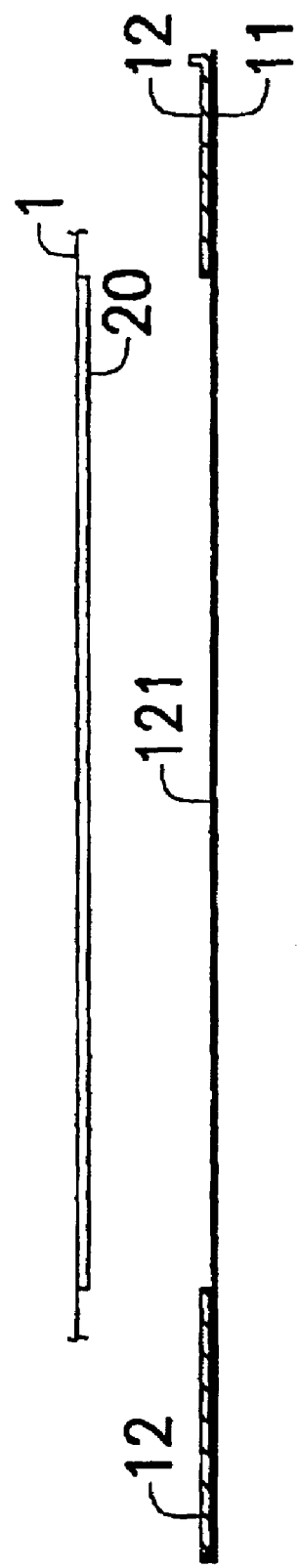
FIG. 3 is a schematic view depicting the relationship between the casing and a unit.

Referring to FIG. 1, a normal electronic device, such as a notebook computer 1, is provided with a casing 10 having a plurality of different parts. One part of the casing 10 is shown in FIG. 2a. FIG. 2b is a cross-section from a line B—B in FIG. 2a, and FIG. 2c is a cross-section from a line C—C in FIG. 2a, and FIG. 2d is a cross-section from a line D—D in FIG. 2a. FIG. 3 is a schematic view depicting the relationship between the casing 10 and parts inside the electronic device 1.

Referring to FIG. 2b and FIG. 2c and FIG. 2d, the casing 10 as disclosed in this invention comprises a first member 11 and a second member 12. Referring to FIG. 3, the electronic device 1 is provided with a unit 20. It is noted that only one unit 20 is shown in FIG. 3; however, there is a plurality of units 20 disposed inside the actual electronic device 1. The second member 12 is disposed on the first member 11, and is provided with a step portion 121 corresponding to the unit 20. It is also noted that the amount of the step portion 121 corresponds to the amount of the units 20.

As shown in FIG. 3, the second member 12 is nearer to the unit 20 than the first member 11. In other words, the first member 11 is used as an outer member of the casing 10, and the second member 12 is used as an inner member of the casing 10 so as to be near to the unit 20.

In addition, the casing 10 further comprises an adhesive portion 13 as shown in FIG. 2d. The adhesive portion 13, disposed between the first member 11 and the second member 12, is used for attaching the first member 11 and the second member 12. The adhesive portion 13 may be glue.

Figure 4:
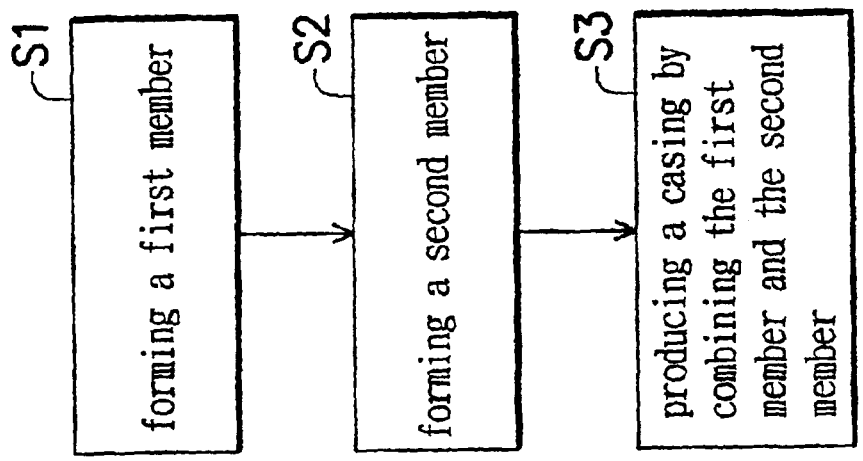
FIG. 4 is a flow chart depicting a method for producing the casing of the electronic device as disclosed in this invention.

Referring to FIG. 4, a method for producing the casing 10 of the electronic device 1 having at least one unit 20, comprises the following steps. In step S1, a first member 11 is formed of a first metallic material. In step S2, a second member 12 is formed of a second metallic material while at least one step portion 121 is formed in the second member 12. In step S3, the casing 10 is produced by combining the first member 11 and the second member 12 in a manner such that the step portion 121 corresponds to the unit 20 and the second member 12 is nearer to the unit 20 than the first member 11. In addition, the first member 11 and the second member 12 are attached to each other by glue in step S3.

Both the first metallic material and the second metallic material are sheets, and the first metallic material and the second metallic material may be the same or different. The first metallic material is preferably thin and hard so that coating is easily painted on the surface of the first member 11. Thus, the quality of the appearance of the casing 10 is maintained beyond a certain level. In addition, the second metallic material is preferably an alloy with a predetermined structural strength so that it can be pressed into the second member 12 with minimal thickness. Thus, the structural strength of the casing 10 can be kept under a thin casing condition. As a result, the electronic device 1, using the casing 10 as disclosed in this invention, can be thin, light and strong.

As stated above, since the casing 10 is produced from the alloy metal sheets, its assembly and structure can be simplified. Also, the inner member of the casing 10 can maintain its structural strength, and the outer member of the casing can maintain the quality of appearance.

It is understood that the combination manner between the first member and the second member is not limited to the adhesive portion as long as their combination can be assured.

While the invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. A method for producing a casing for an electronic device comprising:
   (a) forming a first member of a first metallic material;
   (b) forming a second member of a second metallic material; and
   (c) producing the casing by combining the first member and the second member.

2. The method as claimed in claim 1, wherein the first member and the second member are attached to each other by glue.

3. The method as claimed in claim 2, wherein both the first metallic material and the second metallic material are sheets.

4. The method as claimed in claim 3, wherein the first metallic material is thin and hard.

5. The method as claimed in claim 3, wherein the second metallic material is provided with a predetermined structural strength.

6. The method as claimed in claim 3, wherein the second metallic material is pressed into the second member, and the second metallic material is an alloy metal sheet.

7. A method for producing a casing for an electronic device, having at least one unit, comprising:
   (a) forming a first member of a first metallic material;
   (b) forming a second member of a second metallic material, wherein the second member is provided with at least one step portion; and
   (c) producing the casing by combining the first member and the second member in a manner such that the step portion corresponds to the unit and the second member is nearer to the unit than the first member.

8. The method as claimed in claim 7, wherein the first member and the second member are attached to each other by glue.

9. The method as claimed in claim 8, wherein both the first metallic material and the second metallic material are sheets.

10. The method as claimed in claim 9, wherein the first metallic material is thin and hard.

11. The method as claimed in claim 9, wherein the second metallic material is provided with a predetermined structural strength.

12. The method as claimed in claim 9, wherein the second metallic material is pressed into the second member, and the second metallic material is an alloy metal sheet.

13. A casing for an electronic device, having at least one unit, comprising:
   a first member made of a first metallic material; and
   a second member, having at least one step portion, made of a second metallic material and disposed on the first member, wherein the step portion corresponds to the unit and the second member is nearer to the unit than the first member.

14. The casing as claimed in claim 13, further comprising:
   an adhesive portion, disposed between the first member and the second member, for attaching the first member and the second member.

15. The casing as claimed in claim 14, wherein the adhesive portion is glue.

16. The casing as claimed in claim 13, wherein both the first metallic material and the second metallic material are sheets.

17. The casing as claimed in claim 16, wherein the first metallic material is thin and hard.

18. The casing as claimed in claim 16, wherein the second metallic material is provided with a predetermined structural strength.

19. The casing as claimed in claim 16, wherein the second metallic material is pressed into the second member, and the second metallic material is an alloy metal sheet.

* * * * *